(12) United States Patent
 Chao

(10) Patent No.: US 10,448,059 B2
(45) Date of Patent: Oct. 15, 2019

(54) FINGERPRINT IMAGE PROCESSING SYSTEM

(71) Applicant: Shenzhen Goodix Technology Co., Ltd., Shenzhen, Guangdong (CN)

(72) Inventor: Weimin Chao, Guangdong (CN)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 39 days.

(21) Appl. No.: 15/784,204

(22) Filed: Oct. 16, 2017

(65) Prior Publication Data

US 2018/0098096 A1  Apr. 5, 2018

Related U.S. Application Data

(63) Continuation of application No. PCT/CN2016/101421, filed on Oct. 1, 2016.

(51) Int. Cl.
 *H04N 19/91* (2014.01)
 *H04N 19/182* (2014.01)
 (Continued)

(52) U.S. Cl.
 CPC ........... *H04N 19/91* (2014.11); *G06F 21/32* (2013.01); *G06K 9/00006* (2013.01); *G06T 9/00* (2013.01);
 (Continued)

(58) Field of Classification Search
 CPC ...... H04N 19/91; H04N 19/42; H04N 19/182; H04N 19/593; G06T 9/00; G06F 21/32; G06K 9/00006
 (Continued)

(56) References Cited

U.S. PATENT DOCUMENTS 5,990,955 A * 11/1999 Koz .................. H04N 19/176
                                                          375/240.01
2005/0152606 A1   7/2005 Wood
(Continued)

FOREIGN PATENT DOCUMENTS

CN       1667639 A      9/2005
CN       1841406 A      10/2006
(Continued)

OTHER PUBLICATIONS

O. Vermesan et al., "A 500-dpi ac capacitive hybrid flip-chip cmos asic/sensor module for fingerprint, navigation, and pointer detection with on-chip data processing", IEEE Journal of Solid-State Circuits, IEEE Service Center, Piscataway, NJ, USA, vol. 38, No. 12, Dec. 1, 2003, pp. 2288-2296, XP011104272.
(Continued)

*Primary Examiner* — Jerome Grant, II
(74) *Attorney, Agent, or Firm* — Winston Hsu

(57) ABSTRACT

The present invention provides a fingerprint image processing system, comprising a pixel transforming circuit, for transforming a signal of a fingerprint to a first bit stream, wherein the first bit stream has a first data volume; and a compression circuit, connected to the pixel transforming circuit, for compressing the first bit stream to generate a second bit stream, wherein the second bit stream has a second data volume; wherein the second data volume is smaller than the first data volume. The fingerprint image processing system provided by the present invention can increase amount of data transmission of the fingerprint image of optic fingerprint recognition, and have advantage of solving the problem of insufficient transmission interface bandwidth.

5 Claims, 4 Drawing Sheets

(51) Int. Cl.
*H04N 19/42* (2014.01)
*H04N 19/593* (2014.01)
*G06K 9/00* (2006.01)
*G06F 21/32* (2013.01)
*G06T 9/00* (2006.01)

(52) U.S. Cl.
CPC ........... *H04N 19/182* (2014.11); *H04N 19/42* (2014.11); *H04N 19/593* (2014.11)

(58) Field of Classification Search
USPC ........................................................ 382/246
See application file for complete search history.

(56) References Cited

U.S. PATENT DOCUMENTS

2009/0154818 A1* 6/2009 Stefanov .................. G06T 9/00
382/239
2016/0224775 A1 8/2016 Lin
2018/0192070 A1* 7/2018 Dupuis ................ H04N 19/105
2018/0352243 A1* 12/2018 Lindberg ............. H04N 19/184

FOREIGN PATENT DOCUMENTS

| CN | 101378506 A | | 3/2009 | |
|---|---|---|---|---|
| CN | 103517071 A | | 1/2014 | |
| CN | 103957411 A | | 7/2014 | |
| JP | H09-187012 A | | 7/1997 | |
| JP | 2005004344 | * | 1/2005 | ............. A61B 5/117 |
| KR | 10-2016-0112810 A | | 9/2016 | |

OTHER PUBLICATIONS

Yuanman Li et al., Anti-Forensics of Lossy Predictive Image Compression, IEEE Signal Processing Letters, IEEE Service Center, Piscataway, NJ, US, vol. 22, No. 12, Dec. 1, 2015, pp. 2219-2223, XP011667904.

* cited by examiner

FINGERPRINT IMAGE PROCESSING SYSTEM

CROSS REFERENCE TO RELATED APPLICATIONS

The present application is a continuation of international application No. PCT/CN2016/101421, filed on Oct. 1, 2016, of which are incorporated herein by reference in its entirety.

FIELD OF THE INVENTION

The present invention relates to a fingerprint image processing system, and more particularly, to a fingerprint image processing system capable of increasing transmission amount of data.

BACKGROUND

With the development of technology, mobile phones, digital cameras, tablet PCs, notebook computers and other portable electronic devices have become essential equipments for human life. To effectively avoid internal data of the personal portable electronic devices being stolen, all kinds of protection methods are provided. For example, password verification, voiceprint recognition or fingerprint recognition and so on, wherein optic fingerprint recognition is widely used. However, current data transmission modules utilized in fingerprint image processing system are restricted because transmission rate cannot be too fast (about 10 MHz) between Serial Peripheral Interface (SPI), Double-sided Flexible Print Circuit (FPC), connector and host. Besides, to achieve more delicate fingerprint images of biometrics, images with high pixel resolution rate always slow down the transmission rate of fingerprint image, and results in insufficient transmission bandwidth.

Therefore, how to provide a fingerprint image processing system to increase the transmission amount of the fingerprint image, and solve problem of insufficient bandwidth of transmission interface have become one of objectives to work on in the industry.

SUMMARY

It is therefore a primary objective of the present invention to provide a fingerprint image processing system capable of increasing transmission amount of fingerprint images, and solving the problem of insufficient bandwidth of transmission interface.

To solve the above mentioned technical problems, the present invention provides a fingerprint image processing system, comprising a pixel transforming circuit, for transforming a signal of a fingerprint to a first bit stream, wherein the first bit stream has a first data volume; and a compression circuit, connected to the pixel transforming circuit, for compressing the first bit stream to generate a second bit stream, wherein the second bit stream has a second data volume; wherein the second data volume is smaller than the first data volume.

Preferably, the fingerprint image processing system further comprises a data buffer, connected to the compression circuit, for storing the second bit stream; and a first processing interface, connected to the data buffer and a processor, for reading the second bit stream stored in the data buffer according to a transmission request of a second processing interface of the processor, and transmitting to the processor.

Preferably, the pixel transforming circuit comprises a pixel matrix unit, for transforming the signal of the fingerprint to electronic signals; an analog front-end unit, connected to the pixel matrix unit, for sampling and reducing noises of the electronic signals of the pixel matrix unit; an analog-to-digital converter, connected to the analog front-end unit, for transforming the electronic signals of the analog front-end unit into digital signals; and a clock controller, for transforming the digital signals to the first bit stream according to a default order.

Preferably, the compression circuit comprises a subtractor, for subtracting a target pixel of the first bit stream from a prediction pixel; an entropy encoder, connected to the subtractor, for encoding the residual generated by the subtrator to generate an original bit stream and a reconstruct pixel; a reconstruct pixel buffer, connected to the entropy encoder, for storing the reconstruct pixel; and a prediction unit, connected to the reconstruct pixel buffer, for generating the prediction pixel according to at least a neighbor pixel corresponding to a location of the prediction pixel stored in the reconstruct pixel buffer.

Preferably, the entropy encoder utilizes Huffman coding or Golomb-Rice coding to process entropy encoding.

Preferably, the compression circuit further comprises a front header unit, connected to the entropy encoder, for compiling the original bit stream into the second bit stream.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
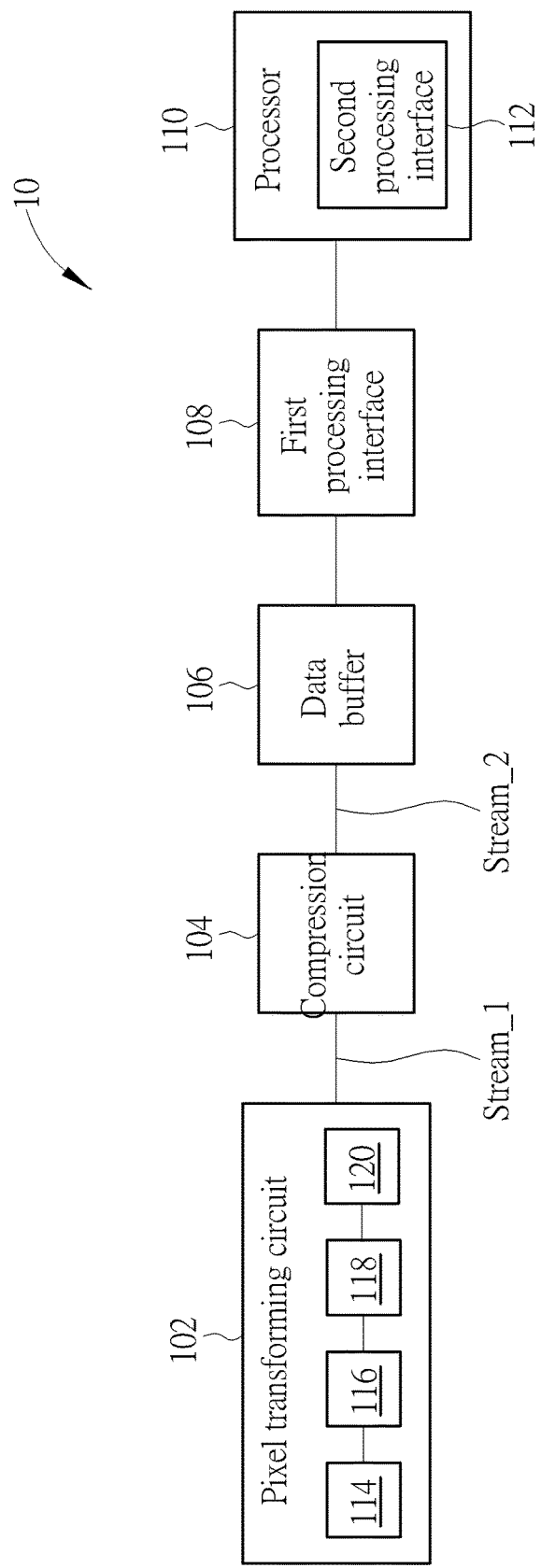
FIG. 1 is a schematic diagram of a fingerprint image processing system according to an embodiment of the present invention.

Please refer to FIG. 1. FIG. 1 is a schematic diagram of a fingerprint image processing system 10 according to an embodiment of the present invention. The fingerprint image processing system 10 includes a pixel transforming circuit 102, a compression circuit 104, a data buffer 106, a first processing interface 108 and a processor 110, wherein the processor 110 includes a second processing interface 112. The pixel transforming circuit 102 is utilized for transforming a signal of a fingerprint to a first bit stream Stream_1, for instance, transforming photons sensed by an optical fingerprint sensor to bit streams. The compression circuit 104 is connected to the pixel transforming circuit 102, and utilized for compressing the first bit stream Stream_1 to generate a second bit stream Stream_2, wherein a second data volume of the second bit stream Stream_2 is smaller than a first data volume of the first bit stream Stream_1. The data buffer 106 is connected to the compression circuit 104, and utilized for storing the second bit stream. Stream_2 generated by the compression circuit 104. In addition, the first processing interface 108 is connected to the data buffer 106, and utilized for reading the second bit stream Stream_2 stored in the data buffer 106, according to a transmission request of the second processing interface 112 of the processor 110, and transmitting the second bit stream Stream_2 to the processor 110 for following fingerprint recognition. For example, Serial Peripheral Interface Slave (SPI slave), i.e. the first processing interface 108, may read the second bit stream Stream_2 from the data buffer 106 according to the transmission request proposed by the Serial Peripheral Interface master (SPI master), i.e. the second processing interface 112, and transmit the second bit stream Stream_2 to the processor 110 to restore the second bit stream Stream_2 into the original fingerprint image, and process the following fingerprint recognition. Therefore, the fingerprint image processing system 10 compresses the fingerprint image to increase recognition rate of the fingerprint image transmission, so as to process more delicate comparison for following fingerprint recognition system.

In detail, the pixel transforming circuit 102 further includes a pixel matrix unit 114, an analog front-end unit 116, an analog-to-digital converter 118 and a clock controller 120. The pixel matrix unit 114 is utilized for transforming the signal of the fingerprint to electronic signals. The analog front-end unit 116 is connected to the pixel matrix unit 114, for sampling the electronic signals of the pixel matrix unit 114, eliminating noises, and amplifying the electronic signals to proper voltage to transmit to the analog-to-digital converter 118. The analog-to-digital converter 118 transforms the electronic signals from the analog front-end unit 116 to digital signals. Then, the clock controller 120 (Timing Controller) transforms the digital signals to the first bit stream Stream_1 according to a default order. In this embodiment, the fingerprint image processing system 10 may compress the first bit stream Stream_1 by the compression circuit 104 without image distortion; for example, the compression circuit 104 may compress the first bit stream Stream_1 with compression level 1, ½, ¼ or ⅛ to generate the second bit stream Stream_2 and store in the data buffer 106. Therefore, when the processor 110 is required to process the fingerprint recognition, the second processing interface 112 proposes the transmission request to the first processing interface 108, and the processor 110 restores the received compressed data to the original image for fingerprint recognition.

Figure 2:
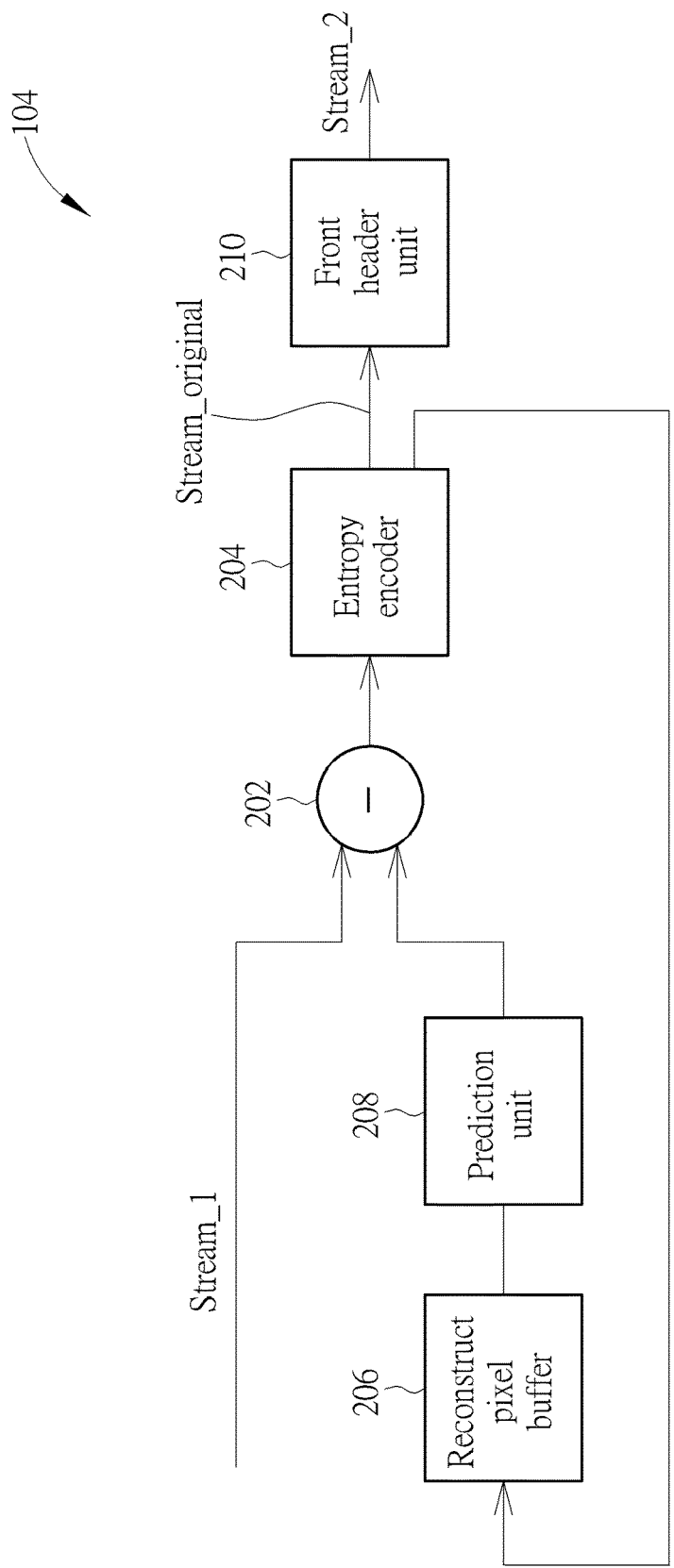
FIG. 2 is a schematic diagram of a compression circuit according to an embodiment of the present invention.

Please refer to FIG. 2. FIG. 2 is a schematic diagram of the compression circuit 104 according to an embodiment of the present invention. The compression circuit 104 includes a subtractor 202, an entropy encoder 204, a reconstruct pixel buffer 206, a prediction unit 208 and a front header unit 210. In the embodiment, the compression circuit 104 receives the first bit stream Stream_1 from the pixel transforming circuit 102. When the compression circuit 104 processes each target pixel X of the first bit stream Stream_1, the reconstruct pixel buffer 206 provides a plurality of reconstruct pixels, neighboring to the target pixel X, to the prediction unit 208, and the prediction unit 208 generates a prediction pixel X' according to the plurality of reconstruct pixels, neighboring to the target pixel X. Then, the subtractor 202 substrates the target pixel X of the first bit stream Stream_1 from the prediction pixel X', generated by the prediction unit 208, and generates a residual. The entropy encoder 204, which is connected to the subtractor 202, performs entropy encoding on the residual, e.g. Huffman Code or Golomb-Rice Code, to generate an original bit stream Stream_original (i.e. the bit stream of the fingerprint image after compression) and the reconstruct pixel bit stream (i.e. provided to the prediction unit 208 as the reconstruct pixels), wherein the original bit stream Stream_original, generated by the entropy encoder 204, passes through the front header unit 210 and is added with a front header to be compiled into the complete second bit stream Stream_2. The second bit stream Stream_2 may be stored in the data buffer 106. Therefore, when the second processing interface 112 of the processor 110 proposes the transmission request, the first processing interface 108 reads the compressed second bit stream Stream_2 stored in the data buffer 106, and transmits to the processor 110, so as to transmit the original image with high recognition rate. Therefore, after the compression circuit compresses the data of the fingerprint image, the present invention provides the fingerprint image with more delicate and high recognition rate biometrics to the processor, and increases transmission amount of data to solve the problem of insufficient bandwidth.

Figure 3A:
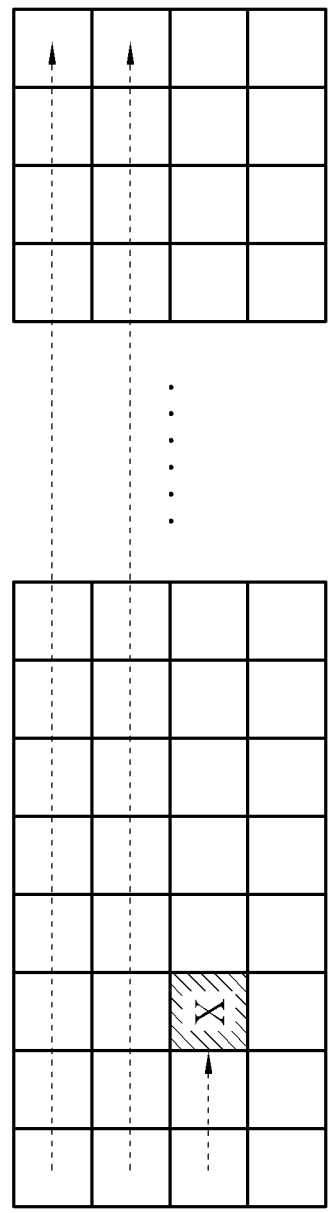
FIG. 3A is a schematic diagram of a pixel input method of a reconstruct pixel buffer according to an embodiment of the present invention.
Figure 3B:
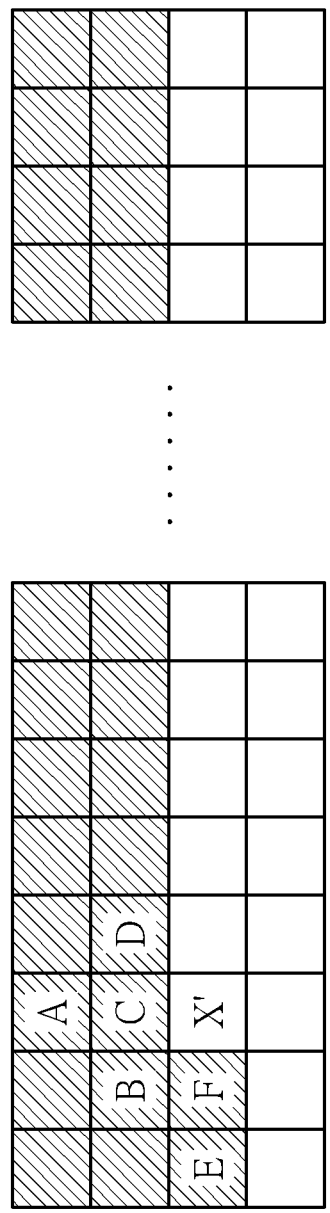
FIG. 3B is a schematic diagram of reconstruct pixels stored in the reconstruct pixel buffer according to an embodiment of the present invention.

In detail, as to the method of the prediction unit 208 generating the prediction pixel, please refer to FIG. 3A and FIG. 3B. FIG. 3A is a schematic diagram of a pixel input method of the reconstruct pixel buffer 206 according to an embodiment of the present invention. FIG. 3B is a schematic diagram of reconstruct pixels stored in the reconstruct pixel buffer 206 according to an embodiment of the present invention. As shown in FIG. 3A, the reconstruct pixels, generated by the entropy encoder 204, are input from left to right and from top to bottom to the reconstruct pixel buffer 206. For example, when the prediction unit 208 is going to generate the prediction pixel X' corresponding to the target pixel X, the reconstruct pixel buffer 206 outputs neighbor pixels A, B, C, D, E and F, corresponding to the prediction pixel X', to the prediction unit 208 to generate the prediction pixel X'.

Note that, the embodiments stated in the above are utilized for illustrating the concept of the present invention. Those skilled in the art may make modifications and alterations accordingly, and not limited herein. For example, the pixel transforming circuit may not only be utilized for transforming optical fingerprint signal to the electronic signals, but also be applied to a capacitor fingerprint recognition system, so as to compress capacitor fingerprint signals and increase transmission efficiency; and the neighbor pixels used as basis for predicting pixels may depend on different system requirements to adopt different image compression methods, which all belong to the scope of the present invention.

In summary, the present invention utilizes the compression circuit to compress the image with high recognition rate and large amount of data into smaller amount of data to facilitate transmission, and to increase the transmission amount of fingerprint recognition and solve the problem of insufficient bandwidth.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint image processing system, characterized by comprising:
    a pixel transforming circuit, for transforming a signal of a fingerprint to a first bit stream, wherein the first bit stream has a first data volume; and
    a compression circuit, directly connected to the pixel transforming circuit, for compressing the first bit stream to generate a second bit stream, wherein the second bit stream has a second data volume;
    a data buffer, connected to the compression circuit, for storing the second bit stream; and
    a first processing interface, connected to the data buffer and a processor, for reading the second bit stream stored in the data buffer according to a transmission request of a second processing interface of the processor, and transmitting to the processor;
    wherein the second data volume is smaller than the first data volume.

2. The fingerprint image processing system of claim 1, characterized in that, the pixel transforming circuit comprises:
    a pixel matrix unit, for transforming the signal of the fingerprint to electronic signals;
    an analog front-end unit, connected to the pixel matrix unit, for sampling and reducing noises of the electronic signals of the pixel matrix unit;
    an analog-to-digital converter, connected to the analog front-end unit, for transforming the electronic signals of the analog front-end unit into digital signals; and
    a clock controller, for transforming the digital signals to the first bit stream according to a default order.

3. The fingerprint image processing system of claim 1, characterized in that, the compression circuit comprises:
    a subtractor, for subtracting a target pixel of the first bit stream from a prediction pixel;
    an entropy encoder, connected to the subtractor, for encoding the residual generated by the subtrator to generate an original bit stream and a reconstruct pixel;
    a reconstruct pixel buffer, connected to the entropy encoder, for storing the reconstruct pixel; and
    a prediction unit, connected to the reconstruct pixel buffer, for generating the prediction pixel according to at least a neighbor pixel corresponding to a location of the prediction pixel stored in the reconstruct pixel buffer.

4. The fingerprint image processing system of claim 3, characterized in that the entropy encoder utilizes Huffman coding or Golomb-Rice coding to process entropy encoding.

5. The fingerprint image processing system of claim 3, characterized in that, the compression circuit further comprises:
    a front header unit, connected to the entropy encoder, for compiling the original bit stream into the second bit stream.

* * * * *